_United States Patent_ [19]

Vojkovic

[11] 3,758,665

[45] Sept. 11, 1973

[54] RECOVERY OF REFRACTORY METAL VALUES

[75] Inventor: Milos Vojkovic, Libertyville, Ill.

[73] Assignee: Continental Ore Corporation, New York, N.Y.

[22] Filed: June 18, 1971

[21] Appl. No.: 154,686

[52] U.S. Cl............... 423/56, 423/58, 423/67, 423/71, 423/81, 423/143, 423/140, 75/123, 75/129, 75/108
[51] Int. Cl.. C01g 23/00, C01g 25/00, C01g 31/00, C01g 33/00, C01g 39/00, C01g 41/00
[58] Field of Search.............. 23/15 W, 19 V, 18, 23/19, 22–24; 75/108, 123, 129; 423/56, 58, 67, 71, 81, 140, 143

[56] References Cited
UNITED STATES PATENTS

| 3,440,035 | 4/1969 | Iwase et al...................... 75/108 X |
| 1,250,063 | 11/1917 | Westling et al. .................. 23/15 W |
| 1,292,559 | 1/1919 | Andersen et al.................. 23/15 W |

FOREIGN PATENTS OR APPLICATIONS

| 1,925,983 | 11/1969 | Germany........................... 23/15 W |

_Primary Examiner_—Herbert T. Carter
_Attorney_—James E. Wolber et al.

[57] ABSTRACT

Refractory metals such as vanadium are recovered from aqueous solutions containing the metal in the form of the oxide by adding to the solution a ferric salt and an ammonium salt of common anion, and a quantity of finely divided carbon. The vanadium is precipitated in the form of an iron-vanadium oxide complex in intimate admixture with the finely divided carbon. The admixture is recovered and can be reduced to produce a ferro-refractory metal-carbon alloy suitable for use as an additive in steel-making.

21 Claims, No Drawings

RECOVERY OF REFRACTORY METAL VALUES

BACKGROUND OF THE INVENTION

Refractory metals, namely vanadium, molybdenum, tungsten, titanium and niobium, are useful alloying elements in steel-making. Refractory metals are desirably incorporated into the steel in a form which is preferably dense and readily soluble in molten iron. Usually these elements are added in the form of a ferro-alloy which desirably contains a major portion of the refractory metal and minor portions of iron and carbon.

Since there exists only limited quantities of high-grade concentrates of refractory materials, and since the beneficiation of minerals containing these elements is generally costly and inefficient, it has been proposed to treat chemically the primary raw material containing the refractory metal, usually to solubilize the refractory metal values in the raw material, and then recover the refractory metal values in a form suitable for use or for further processing. Exemplary of such prior practice is the recovery of vanadium values from vanadium-bearing slag. The slag is crushed, ground, and typically admixed with an alkaline material such as soda ash or sodium carbonate. The admixture is roasted to place the vanadium values mainly in the form of $V_2O_5$, and the roasted slag is leached with water or an aqueous liquor to extract the vanadium values as an alkali vanadate. The resulting aqueous liquid may be treated, if desired, to remove impurities, and the vanadium values are precipitated by the addition of a suitable complexing agent such as ferric sulfate.

Other processes are known in which a roasted vanadium ore is leached with a mineral acid to solubilize the vanadium values, followed by a similar precipitation step. The recovered vanadium-containing precipitate is reduced, usually in the presence of carbon and iron, to form a useful vanadium steel-making additive.

Similar processes are applicable to the other refractory metals, especially molybdenum and tungsten.

This invention relates to an improved process for the recovery of refractory metal values from aqueous solution. The recovered values are in a form especially adapted for further processing to produce a refractory metal additive which is particularly useful in steel-making.

DESCRIPTION OF THE INVENTION

In accordance with this invention refractory metal values are recovered from aqueous solution which contains such values largely in the highest state of oxidation, i.e., pentavalent state for vanadium and hexavalent state for tungsten and molybdenum. By this it is meant that not less than about 80 percent of the refractory metal values are in the highest state of oxidation. The presence of small amounts of values in a lower state of oxidation is well tolerated in the process. A ferric salt of a strong mineral acid is added to the aqueous solution in an amount to provide an iron to refractory metal mass ratio in the range of 0.1:1.0 to 1.0:1.0. Ammonium ion is also present, preferably as either the hydroxide or as an ammonium salt of the same anion as the ferric salt, and in an amount to provide an ammonium to refractory metal mass ratio in the range of 0.05:1.0 to 1.5:1.0. Finely divided carbon is preferably added to the solution in an amount to provide a carbon to refractory metal mass ratio in the range of 0.6:1.0 to 0.8:1.0 and thoroughly dispersed throughout the solution. An iron-refractory metal complex is then precipitated, preferably at a pH in the range of about 2.5 to 4.0, and the precipitated complex and carbon are recovered from the solution in intimate admixture by filtration or centrifugation. The temperature of precipitation is not critical, temperatures between ambient and the boiling point of the solution being satisfactory, with about 60°C. being preferred.

The recovered admixture of carbon and refractory metal-iron complex may be dried and reduced by known techniques to provide a desirable steel-making additive.

In some instances, because of product specifications requiring high vanadium content, the quantity of ferric salt added may be less than adequate to provide desired refractory metal recoveries. In such instances the aqueous liquor separated from the precipitated refractory metal-containing complex will be further processed by adding additional amounts of ferric salt. Due to the relatively low concentrations of refractory metal in this liquor, the addition of moderate quantities of ferric salt will result in very high iron to refractory metal mass rotios, resulting in the precipitation of further quantities of refractory metal as an iron-refractory metal complex. This complex, which may be too high in iron and too low in refractory metal to provide a suitable product, is separated from the aqueous liquor as before described. Advantageously, the precipitated complex is dissolved in an aqueous solution of strong mineral acid, preferably a mineral acid of common anion with the aforesaid ferric salt, and recycled to the initial precipitation step of the process. In this manner recovery of refractory metal values is substantially increased, with the recycle further providing some or all of the ferric salt required for the initial precipitation.

Where the raw material used in the process is at least in part an acidic aqueous liquor containing refractory metal values, this acidic aqueous liquor advantageously provides the aqueous solution of strong mineral acid in which the secondary precipitated iron-refractory metal complex is dissolved.

The process of this invention is applicable to the purification and recovery of vanadium, molybdenum, tungsten, titanium, and columbium. The invention will be specifically illustrated with reference to the purification and recovery of vanadium.

EXAMPLE I

Fuel ash residue was used as the primary raw vanadium source. The fuel ash residue assayed 66.4% $V_2O_5$, 4.62% $Fe$, 5.73% $SiO_2$, < 0.10% $P_2O_5$, 1.38% $CaO$, and 0.58% $MgO$.

This ash residue was processed by known technology to yield an alkaline liquor containing 84.93 grams per liter of vanadium calculated as $V_2O_5$, and an acidic liquor containing 6.07 grams per liter of vanadium calculated as $V_2O_5$. The recovery of vanadium at this stage was 98.86 percent of the content of the fuel ash residue. The alkaline and acidic liquors were prepared by first fusing the ash residue with sodium carbonate, leaching the fused admixture with water, and then leaching the solid residue from the first leach with sulfuric acid.

The vanadium-containing solutions were blended together in the ratio of 1.0 liter of alkaline solution to 0.3 liter of acidic solution. Finely divided carbon was added to the admixture in the amount of 43.2 grams per liter, followed by the addition of ferric sulfate and ammonium sulfate in an amount sufficient to provide an $Fe^{+++}$ concentration of 56 grams per liter and an $NH_4^+$ concentration of 18 grams per liter. The pH of the resulting solution was adjusted to a value of 3.5 by the addition of about 25 cc of 50 percent aqueous caustic soda. The solution, which was at a temperature of about 60°C., was agitated for 1 hour. The resulting slurry was filtered with suction and the solid residue was washed with 1% aqueous ammonium chloride and dried at about 105°C. The loss on drying was 69.1 percent. The combined filtrate and wash water analyzed 0.18 grams per liter of $V_2O_5$. The overall recovery of vanadium based upon the content of the admixed aqueous alkaline and acid solutions was 99.1 percent.

THe dried product of the foregoing example was reduced at an elevated temperature to produce a substantially oxygen-free metallic product suitable for use as a steel-making additive.

The foregoing example was repeated using the same admixture of alkaline and acidic vanadium-containing solutions, but with the addition of amounts of carbon, ferric sulfate, and ammonium sulfate to provide the carbon to vanadium, iron to vanadium, and ammonium to vanadium mass ratios hereinafter specified in Table 1. The results of the experiment and the character of the metallic additive produced by reduction of the dried, recovered vanadium precipitate complex are set forth in Table 1.

Example I. The 0.3 liter of acidic solution is then combined with another 1.0 liter of the alkaline solution described in Example I. The primary precipitation is then repeated after adding additional quantities of ferric sulfate, ammonium sulfate and carbon to provide the iron to vanadium, ammonium to vanadium, and carbon to vanadium ratios of Test A–4. The primary precipitation is again carried out as described in Example I, Test A–4.

EXAMPLE III.

A molybdenite concentrate assaying approximately 35 percent molybdenum and 2–3 percent copper was employed as a primary raw material for the preparation of aqueous solutions of molybdenum. The raw material was processed by known means as in Example I to yield an alkaline solution containing 91.3 grams per liter of molybdenum (calculated as $Mo$) and an acidic solution containing 20.5 grams per liter of molybdenum (calculated as $Mo$). The recovery of molybdenum at this stage was 98.43 percent of the molybdenum contained in the molybdenite concentrate.

The molybdenum-containing solutions were admixed in the ratio of 1 liter of alkaline solution to 1 liter of acidic solution and to the admixture was added ferric sulfate in an amount to provide 11.2 grams of $Fe$.

The pH of the resulting slurry was about 1.8 and was adjusted to a value of 3.5 by the addition of aqueous ammonia. The resulting solution was agitated for 30

TABLE 1

| Test No. | Precipitation mass ratios | | | Percent recovery V in solution | Reduced vanadium additive Percent | | | | |
|---|---|---|---|---|---|---|---|---|---|
| | $Fe^{+++}/V$ | $NH_4^+/V$ | C/V | | V | Fe | C | O | C/V |
| 1—A4 | 0.110 | 1.63 | 0.71 | 91.0 | 72.2 | 7.6 | 16.46 | 0.30 | 0.21 |
| 2—A5 | 0.108 | 1.61 | 0.76 | 92.7 | 75.8 | 7.5 | 18.02 | 0.35 | 0.24 |
| 3—B3 | 0.163 | 1.07 | 0.65 | 92.1 | 76.1 | 12.1 | 13.80 | 0.46 | 0.18 |
| 4—B4 | 0.163 | 1.06 | 0.70 | 92.3 | 75.5 | 11.7 | 14.61 | 0.43 | 0.19 |
| 5—C3 | 0.239 | 1.13 | 0.72 | 93.8 | 69.9 | 15.4 | 13.61 | 0.73 | 0.19 |
| 6—C4 | 0.234 | 1.11 | 0.76 | 95.5 | 69.5 | 15.6 | 14.67 | 0.78 | 0.21 |
| 7—D4 | 0.320 | 1.28 | 0.68 | 96.0 | 64.2 | 21.4 | 13.56 | 0.47 | 0.21 |
| 8—D5 | 0.310 | 1.27 | 0.72 | 97.1 | 64.1 | 21.5 | 15.04 | 0.42 | 0.23 |
| 9—E4 | 0.64 | 1.18 | 0.68 | 96.5 | 56.0 | 35.8 | 7.00 | 0.42 | 0.13 |
| 10—E5 | 0.61 | 1.19 | 0.71 | 98.7 | 55.7 | 34.9 | 11.29 | 0.19 | 0.20 |
| 11—F6 | 0.86 | 0.28 | 0.79 | 93.1 | 47.6 | 46.0 | 7.15 | 0.57 | 0.15 |
| 12—F7 | 0.85 | 0.27 | 0.81 | 94.5 | 47.8 | 46.4 | 7.66 | 0.43 | 0.16 |
| 13—G7 | 1.00 | 0.32 | 0.82 | 99.9 | 45.8 | 50.3 | 5.57 | 0.79 | 0.12 |
| 14—G8 | 1.00 | 0.32 | 0.85 | 99.9 | 44.6 | 50.7 | 6.39 | 0.48 | 0.14 |
| 15—H7 | 1.23 | nil | 0.78 | 99.9 | 42.0 | 50.8 | 8.34 | 0.80 | 0.20 |
| 16—H8 | 1.37 | nil | 0.82 | 99.9 | 40.3 | 49.6 | 13.05 | 0.34 | 0.32 |

EXAMPLE II.

The vanadium recovery of 91 percent obtained in Test A–4 of Table 1 is considered inadequate. Accordingly, the aqueous liquor separated from the precipitated vanadium complex, which liquor contains about 8.2 grams of vanadium calculated as $V_2O_5$, is treated by the addition of ferric sulfate in an amount equal to that used in the initial precipitation step of Test A–4, i.e., an amount sufficient to provide an iron to vanadium mass ratio of 1.22 to 1.00 in the separated aqueous liquor.

The solution is agitated for a period of 1 hr. and filtered with suction. The solid residue contained about 8.1 grams of vanadium, calculated as $V_2O_5$, together with most of the added iron.

The precipitate is dissolved in a second 0.3 liter of the acidic vanadium-containing solution described in minutes, and the resulting slurry was filtered using suction and the solids washed with water containing 1% ammonium chloride. The solids were removed and dried at 105°C. to give a loss on drying of 75.5 percent. The combined filtrate and wash analyzed 2.63 grams per liter molybdenum.

The dried solids, containing 94.04 percent of the molybdenum initially present in the alkaline and acidic solutions were found upon analysis to contain 33.69% molybdenum, 12.14% $Fe$, 0.032% $Cu$, and 0.106% $Si$.

The dried solids were reduced at an elevated temperature with a loss in weight of 53.63 percent to produce a metallic additive suitable for use in steel-making. The additive analyzed:

$Mo$ — 72.49 percent
$Fe$ — 26.10 percent
$Cu$ — 0.07 percent

S — < 0.1 percent
Si — 0.23 percent
O — 0.59 percent

EXAMPLE IV

A scheelite concentrate analyzed 72.61% $WO_3$, 0.3% Sn, 0.05% P, 0.36% S, 19.25% CaO, 0.37% Mo, 0.06% Mn, 1.12% Fe; and a wolframite concentrate assaying 66.5% $WO_3$, 2.13% $SiO_2$, 25.00% FeO, 0.08% P, and 0.014% S, were used as primary raw tungsten sources. Both raw materials were processed by known means to give ultimately a solution of ammonium tungstate containing 76.5 grams per liter tungsten (calculated as W). The recovery of tungsten at this stage was 97.9 percent of the tungsten contained in the scheelite concentrate and 90.9 percent of the tungsten contained in the wolframite concentrate.

The ammonium tungstate solution was treated at ambient temperature by adding 18.4 grams per liter of iron as ferric sulfate. The pH of the resulting slurry, which was 9.2, was adjusted to 3.5 by the addition of 129.7 cc of concentrated hydrochloric acid (specific density 1.18). The resulting slurry was agitated in cold for 60 minutes. The slurry was filtered with suction and the solids washed with water. The washed solids were removed and dried at 105°C. to give a loss on drying of 44.5 percent. The combined filtrate and wash analyzed 2.53 grams per liter tungsten.

The dried solids, which contained 92.3 percent of the tungsten initially present in the aqueous solution, were found to analyze 51.62 percent tungsten and 12.77 percent iron. The dried solids were reduced at elevated temperature to produce a metallic additive suitable for use in steel-making. The loss in weight on reduction was 34.7 percent. The resulting metallic additive analyzed:

Tungsten — 79.06 percent
Iron — 20.19 percent
Phosphorus — less than 0.02 percent
Sulphur — 0.1 percent
Oxygen — 0.30 percent
Arsenic — less than 6.5 ppm The following mass ratios are preferred:

| Refractory Metal | Fe/Ref. Metal | $NH_4$/Ref. Metal | C/Ref. Metal |
|---|---|---|---|
| Vanadium | 0.1:1.0 to 0.25:1.0 | 1.0:1.0 to 1.4:1.0 | 0.65:1.0 to 0.8:1.0 |
| Tungsten | 0.1:1.0 to 0.3:1.0 | 0.05:1.0 to 0.2:1.0 | 0.8:1.0 |
| Molybdenum | 0.1:1.0 to 0.6:1.0 | 0.1:1.0 to 0.2:1.0 | |

A preferred pH for the precipitation step is 3.0 to 3.5.

In the embodiment of the invention in which the aqueous liquor, after recovery of the iron-refractory metal complex, is treated with additional ferric salt to enhance recovery of the refractory metal values, it is preferred that the ferric salt in this second addition be employed in an amount sufficient to provide an iron to refractory metal mass ratio in the range of about 0.5:1.0 to 3.0:1.0.

What is claimed is:

1. The method of purifying and recovering refractory metal values comprising establishing an aqueous solution containing a refractory metal in the highest state of oxidation, dispersing finely divided carbon in said solution in an amount sufficient to provide a carbon to refractory metal mass ratio in the range of about 0.6:1.0 to 0.8:1.0, adding to said solution a ferric salt of a strong mineral acid in an amount sufficient to provide an iron to refractory metal mass ratio in the range of about 0.1:1.0 to 1.0:1.0, precipitating an iron-refractory metal-containing complex at a pH in the range of 2.5 to 4.0, in the presence of ammonium ion in an amount to provide an ammonium to refractory metal mass ratio in the range of 0.05:1.0 to 1.6:1.0, and recovering a precipitated refractory metal complex intimately admixed with carbon from the aqueous solution.

2. The method in accordance with claim 1 in which said refractory metal is vanadium, molybdenum, or tungsten.

3. The method in accordance with claim 1 in which said refractory metal is vanadium.

4. The method in accordance with claim 3 in which said ammonium is provided by the addition of an ammonium salt of common anion with said ferric salt.

5. The method in accordance with claim 4 in which said iron to vanadium mass ratio is in the range of about 0.10:1.0 to 0.25:1.0.

6. The method in accordance with claim 5 in which said ammonium to vanadium mass ratio is in the range of about 1.0:1.0 to 1.4:1.0.

7. The method in accordance with claim 6 in which said carbon to vanadium mass ratio is in the range of about 0.65:1.0 to 0.8:1.0.

8. The method in accordance with claim 7 in which the precipitation is carried out at a pH within the range of 3.0 to 3.5.

9. The method in accordance with claim 8 in which said ammonium anion is the chloride ion.

10. The method in accordance with claim 2 in which said aqueous solution, after recovery of said complex, is further treated by the addition of a ferric salt in an amount sufficient to provide an iron to refractory metal mass ratio in the range of about 0.5:1.0 to 3.0:1.0, and including the steps of precipitating a secondary iron-refractory metal complex and recovering said secondary complex from said aqueous solution.

11. The method in accordance with claim 10 including the steps of dissolving said secondary complex in an aqueous solution of strong mineral acid, and recycling said dissolved complex to the initial precipitation step.

12. The method in accordance with claim 11 in which said strong mineral acid is of common anion with said ferric salt.

13. The method in accordance with claim 12 in which said aqueous solution of strong mineral acid is a solution containing said refractory metal in its highest state of oxidation.

14. The method in accordance with claim 1 in which said refractory metal is molybdenum.

15. The method in accordance with claim 14 in which said iron to molybdenum mass ratio is in the range of about 0.1:1.0 to 0.6:1.0.

16. The method in accordance with claim 15 in which said ammonium to molybdenum mass ratio is in the range of about 0.1:1.0 to 0.2:1.0.

17. The method in accordance with claim 16 in which the precipitation is carried out at a pH within the range of 3.0 to 3.5.

18. The method in accordance with claim 1 in which said refractory metal is tungsten.

19. The method in accordance with claim 18 in which said iron to tungsten mass ratio is in the range of about 0.1:1.0 to 0.3:1.0.

20. The method in accordance with claim 18 in which said ammonium to tungsten mass ratio is in the range of about 0.05:1.0 to 0.2:1.0.

21. The method in accordance with claim 20 in which the precipitation is carried out at a pH within the range of 3.0 to 3.5.

* * * * *

PO-1050
(5/69)

UNITED STATES PATENT OFFICE
CERTIFICATE OF CORRECTION

Patent No. 3,758,665                Dated   September 11, 1973

Inventor(s)  Milos Vojkovic

It is certified that error appears in the above-identified patent and that said Letters Patent are hereby corrected as shown below:

Column 1, line 28, the word "liquid" should be --liquor--.

Column 2, line 23, "rotios" should be --ratios--.

Column 3, line 16, "THe" should be written --The--.

Column 5, in the table at line 45, in the third column, "$Nh_4$/Ref." should read --$NH_4$/Ref.--. In the second line under this reference "104:1.0" should be --1.4:1.0--. In the last column, under C/Ref., the third line "0.8:1.0" should be deleted.

Signed and sealed this 9th day of April 1974.

(SEAL)
Attest:

EDWARD M. FLETCHER, JR.              C. MARSHALL DANN
Attesting Officer                     Commissioner of Patents